United States Patent
Holand et al.

(10) Patent No.: US 10,513,895 B2
(45) Date of Patent: Dec. 24, 2019

(54) PIPE TRANSPORT SYSTEM AND METHOD

(71) Applicant: Cameron International Corporation, Houston, TX (US)

(72) Inventors: Max Holand, Kristiansand (NO); Dag Holen, Kristiansand (NO); Glenn Sæbø, Kristiansand (NO)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 0 days.

(21) Appl. No.: 15/583,512

(22) Filed: May 1, 2017

(65) Prior Publication Data

US 2017/0314348 A1    Nov. 2, 2017

Related U.S. Application Data

(60) Provisional application No. 62/330,141, filed on Apr. 30, 2016.

(51) Int. Cl.
*E21B 19/15* (2006.01)
*B65G 15/24* (2006.01)

(52) U.S. Cl.
CPC ............ *E21B 19/155* (2013.01); *B65G 15/24* (2013.01)

(58) Field of Classification Search
CPC ........ B65G 15/24; B65G 15/42; B65G 21/10; E21B 19/15; E21B 19/155; E21B 19/08; B60P 3/08; B60P 1/04
USPC ................... 14/35, 36, 37, 60, 69.5; 175/52; 198/313, 314, 316.1, 593; 410/26; 414/22.51–22.59, 22.61–22.69, 537
See application file for complete search history.

(56) References Cited

U.S. PATENT DOCUMENTS

| | | | | |
|---|---|---|---|---|
| 1,462,510 A | * | 7/1923 | Lister | B65G 25/10 198/311 |
| 2,790,683 A | * | 4/1957 | Clark | E21B 19/155 108/145 |
| 3,051,295 A | * | 8/1962 | Moy | B65G 41/002 198/313 |
| 3,184,045 A | * | 5/1965 | Fry | B60P 1/38 198/316.1 |

(Continued)

FOREIGN PATENT DOCUMENTS

| | | | | |
|---|---|---|---|---|
| CA | | 2833729 A1 | 5/2014 | |
| WO | WO-2013069033 A1 | * | 5/2013 | ........... E21B 19/155 |

OTHER PUBLICATIONS

Catwalk, Automated Rig Technologies, 2016 http://www.automatedrig.com/catwalk.html.

*Primary Examiner* — Gregory W Adams
(74) *Attorney, Agent, or Firm* — Helene Raybaud

(57) ABSTRACT

A catwalk for transporting tubular members of a well system includes a substructure, a first transport frame pivotally coupled to the substructure at a first pivotal joint and including a first support surface configured to engage the tubular member, a second transport frame pivotally coupled to the first transport frame at a second pivotal joint and including a second support surface configured to engage the tubular member, and a strut pivotally coupled between the second transport frame and the substructure, wherein the strut is configured to transfer the weight of the tubular member from the second transport frame to the substructure when the tubular member is transported between the first support surface and the second support surface.

7 Claims, 5 Drawing Sheets

(56) References Cited

U.S. PATENT DOCUMENTS

| | | | | |
|---|---|---|---|---|
| 3,623,597 A | * | 11/1971 | Arndt | B65G 21/14 |
| | | | | 198/316.1 |
| 4,347,028 A | * | 8/1982 | Dugan | E21B 19/155 |
| | | | | 414/22.61 |
| 4,474,520 A | * | 10/1984 | Buckner | E21B 19/15 |
| | | | | 187/245 |
| 6,695,559 B1 | | 2/2004 | Pietras | |
| 6,969,223 B2 | * | 11/2005 | Tolmon | E21B 19/155 |
| | | | | 414/22.54 |
| 7,025,547 B2 | * | 4/2006 | Boydstun, IV | B60P 3/08 |
| | | | | 410/26 |
| 2011/0044787 A1 | | 2/2011 | Fikowski et al. | |
| 2015/0008038 A1 | * | 1/2015 | Folk | E21B 19/155 |
| | | | | 175/52 |
| 2015/0139773 A1 | * | 5/2015 | Nikiforuk | E21B 19/15 |
| | | | | 414/814 |
| 2015/0224907 A1 | * | 8/2015 | Holmgren | B60P 3/08 |
| | | | | 414/482 |
| 2016/0017674 A1 | * | 1/2016 | Richardson | E21B 19/155 |
| | | | | 175/24 |

* cited by examiner

PIPE TRANSPORT SYSTEM AND METHOD

CROSS-REFERENCE TO RELATED APPLICATIONS

This application claims benefit of U.S. provisional patent application Ser. No. 62/330,141 filed Apr. 30, 2016, and entitled "Pipe Transport system and Method," which is hereby incorporated herein by reference in its entirety.

STATEMENT REGARDING FEDERALLY SPONSORED RESEARCH OR DEVELOPMENT

Not applicable.

BACKGROUND

Well systems configured for the production of oil and gas include running tubular members or drill pipes into and out of a borehole of the well system that extends into a subterranean earthen formation. In some applications, the individual drill pipe joints are transported from a storage area distal a drilling platform of the well system to a rig floor of the drilling platform utilizing a catwalk or other system configured to transport the pipe joint. Once on the rig floor, the pipe joint may be threadably connected to another drill pipe joint to form part of a drill string extending through the rig floor and into the borehole via a wellhead disposed at the surface. In some applications, the catwalk is affixed or otherwise coupled to the drilling platform in order to support the weight of the catwalk as well as the pipe joint transported by the catwalk from the storage area to the rig floor.

SUMMARY

An embodiment of catwalk for transporting tubular members of a well system comprises a substructure, a first transport frame pivotally coupled to the substructure at a first pivotal joint and comprising a first support surface configured to engage the tubular member, a second transport frame pivotally coupled to the first transport frame at a second pivotal joint and comprising a second support surface configured to engage the tubular member, and a strut pivotally coupled between the second transport frame and the substructure, wherein the strut is configured to transfer the weight of the tubular member from the second transport frame to the substructure when the tubular member is transported between the first support surface and the second support surface. In some embodiments, the catwalk further comprises a third pivotal joint coupling a first end of the strut with the second transport frame, and a fourth pivotal joint coupling a second end of the strut with the substructure. In some embodiments, the catwalk further comprises an actuator having a first end pivotally coupled to the first transport frame and a second end pivotally coupled to the substructure, wherein the actuator is configured to actuate the catwalk between a first position configured to receive the tubular member and a second position configured to transport the tubular member between the first support surface and the second support surface. In certain embodiments, the actuator is coupled to the substructure at the fourth pivotal joint. In certain embodiments, the actuator is configured to rotate the first transport frame in a first rotational direction about the first pivotal joint in response to extending the first end of the actuator from the second end of the actuator, the actuator is configured to rotate the second transport frame about a third pivotal joint coupling the strut with the second transport frame in a second rotational direction opposite the first rotational direction in response to extending the first end of the actuator from the second end of the actuator, and the actuator is configured to rotate the strut about the fourth pivot joint in the second rotational direction in response to extending the first end of the actuator from the second end of the actuator. In some embodiments, a first longitudinal axis of the first support surface is disposed at an angle relative to a second longitudinal axis of the second support surface when the catwalk is in the first position, the first longitudinal axis is disposed parallel with the second longitudinal axis when the catwalk is in the second position, and the strut is configured to transfer the weight of the second transport frame to the substructure when the catwalk is disposed in the second position. In certain embodiments, a first end of the second transport frame is displaced horizontally relative to the substructure when the catwalk is actuated between the first and second positions. In certain embodiments, the catwalk further comprises an actuator having a first end pivotally coupled to the second transport frame and a second end pivotally coupled to the first transport frame, wherein the actuator is configured to actuate the catwalk between a first position configured to receive the tubular member and a second position configured to transport the tubular member between the first support surface and the second support surface.

An embodiment of a catwalk for transporting tubular members of a well system comprises a substructure, a first transport frame pivotally coupled to the substructure at a first pivotal joint and comprising a first support surface configured to engage the tubular member, a second transport frame pivotally coupled to the first transport frame at a second pivotal joint and comprising a second support surface configured to engage the tubular member, and an actuator having a first end pivotally coupled to the first transport frame and a second end pivotally coupled to the substructure, wherein the actuator is configured to actuate the catwalk between a first position configured to receive the tubular member and a second position configured to transport the tubular member between the first support surface and the second support surface. In some embodiments, the catwalk further comprises a ram configured to displace the tubular member in a linear direction between the first support surface and the second support surface. In some embodiments, the ram is configured to push against an end of the tubular member to displace the tubular member between the first support surface and the second support surface. In certain embodiments, the first support surface comprises a first central groove configured to receive the tubular member, the second support surface comprises a second central groove configured to receive the tubular member, and the ram is configured to travel through both the first central groove and the second central groove. In certain embodiments, the catwalk further comprises a strut pivotally coupled between the second transport frame and the substructure, wherein the strut is configured to transfer the weight of the tubular member from the second transport frame to the substructure when the tubular member is transported between the first support surface and the second support surface. In some embodiments, the actuator is configured to rotate the first transport frame in a first rotational direction about the first pivotal joint in response to extending the first end of the actuator from the second end of the actuator, and the actuator is configured to rotate the second transport frame about a third pivotal joint coupling the strut with the second transport frame in a second rotational direction opposite the first rotational direction in response to extending the first end of the actuator from the second end of the actuator. In some embodiments, a first longitudinal axis of the first support surface is disposed at an angle relative to a second longitudinal axis of the second support surface when the catwalk is in the first position, and the first longitudinal axis is disposed parallel with the second longitudinal axis when the catwalk is in the second position.

An embodiment of a catwalk for transporting tubular members of a well system comprises a substructure, a first transport frame pivotally coupled to the substructure at a first pivotal joint and comprising a first support surface configured to engage the tubular member, and a second transport frame pivotally coupled to the first transport frame at a second pivotal joint and comprising a second support surface configured to engage the tubular member, wherein the catwalk comprises a first position configured to receive the tubular member, a first longitudinal axis of the first support surface disposed at an angle relative a second longitudinal axis of the second support surface when the catwalk is in the first position, wherein the catwalk comprises a second position configured to transport the tubular member between the first support surface and the second support surface, the first longitudinal axis disposed parallel with the second longitudinal axis when the catwalk is in the second position, wherein the substructure is configured to support the entire weight of the tubular member when the tubular member is transported between the first support surface and the second support surface. In some embodiments, the substructure comprises a pair of elongate support members extending between a first end and a second end of the catwalk. In some embodiments, the catwalk further comprises a pair of struts pivotally coupled between the second transport frame and the pair of support members, wherein the struts are configured to transfer the weight of the tubular member from the second transport frame to the support members when the tubular member is transported between the first support surface and the second support surface, a pair of third pivotal joints coupling the struts with the second transport frame, and a pair of fourth pivotal joints coupling the struts with the support members, wherein the pair of fourth pivotal joints are disposed adjacent a first end of the substructure and the first pivotal joint is disposed adjacent a second end of the substructure. In certain embodiments, the catwalk further comprises a pair of actuators, each actuator having a first end pivotally coupled to the first transport frame and a second end pivotally coupled to one of the support members at one of the pair of fourth pivot joints, wherein the actuators are configured to actuate the catwalk between the first position and the second position. In some embodiments, a first end of the second transport frame is configured to overhang but remain vertically spaced from a rig floor of the well system when the catwalk is in the second position. In some embodiments, the catwalk further comprises a ram configured to displace the tubular member in an inclined linear direction between a first pipe position and a second pipe position, wherein, when the tubular member is in the first pipe position, the ram is disposed on the first support surface, wherein, when the tubular member is in the second pipe position, the ram is disposed on the second support surface. In some embodiments, the catwalk further comprises a pair of actuators, each actuator having a first end pivotally coupled to the second transport frame and a second end pivotally coupled to the first transport frame, wherein the actuators are configured to actuate the catwalk between the first position and the second position.

BRIEF DESCRIPTION OF THE DRAWINGS

For a detailed description of exemplary embodiments, reference will now be made to the accompanying drawings in which.

DETAILED DESCRIPTION

Figure 1:
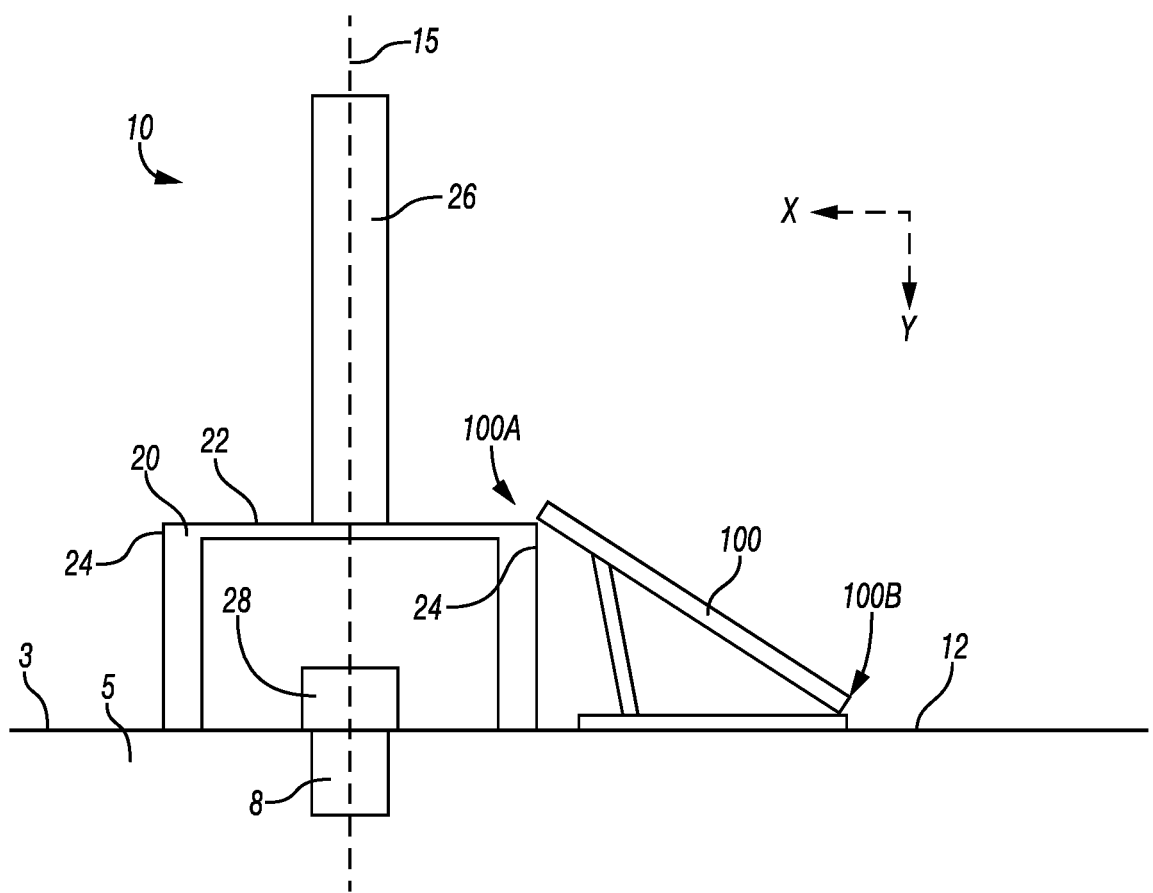
FIG. 1 is a schematic view of an embodiment of a well system in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIG. 1 is a schematic diagram showing an embodiment of a well system 10 having a central or longitudinal axis 15. In the embodiment shown in FIG. 1, central axis 15 of well system 10 extends substantially vertically (e.g., extending substantially parallel to the Y-axis shown in FIG. 1) relative to the substantially horizontally or laterally extending (e.g., extending substantially parallel to the X-axis shown in FIG. 1) surface 3. In some embodiments, well system 10 may be configured to extract various minerals and natural resources, including hydrocarbons (e.g., oil and/or natural gas), or configured to inject substances into an earthen surface 3 and an earthen formation 5 via a well or wellbore 8 extending into formation 5. In the embodiment shown in FIG. 1, well system 10 generally includes a drilling rig or platform 20, a wellhead 28, and an automated catwalk or pipe transport system 100. Platform 20 includes a rig floor 22 that is elevated from the surface 3 and extends laterally between pair of lateral sides or ends 24. Additionally, platform 20 includes a derrick or mast 26 extending vertically along longitudinal axis 15 from rig floor 22, where mast 26 is configured to assist in the insertion and removal of tubular members, such as drill pipes, to and/or from wellbore 8.

Wellhead 28 of well system 10 extends vertically from surface 3 and is disposed coaxial with longitudinal axis 15 of well system 10. Wellhead 28 is configured to control fluid communication between wellhead 8 and the surrounding environment and is further configured to provide for the insertion and removal of a drill string of well system 10 from wellbore 8, where the drill string comprises a series of tubular members or drill pipes threadably connected end-to-end. For example, in some embodiments, when running the drill string into wellbore 8, an individual drill pipe joint is transported to rig floor 22 and coupled with an upper end of the drill string that extends vertically upwards through a hole in the rig floor 22 aligned with longitudinal axis 15.

In the embodiment shown in FIG. 1, transport system 100 includes a first end 100A positionable adjacent rig floor 22 and a second end 100B positionable distal rig floor 22 at a tubular member or drill pipe storage area 12, where storage area 12 is both vertically and laterally spaced from the rig floor 22 of platform 20. Transport system 100 of well system 10 is generally configured to transport tubular members, including drill pipe joints, between storage area 12 disposed distal drilling platform 20 to rig floor 22 of platform 20. Given that storage area 12 is disposed at or near the surface 3, transport system 100 is configured to transport drill pipe joints both laterally and vertically respective longitudinal axis 15 in order to transport the drill pipe joints from area 12 to rig floor 22. Additionally, in this embodiment, the transport system 100 comprises a stand-alone device or system that includes all necessary structures to move and support the drill pipe joints. In some embodiments, the transport system 100 is not coupled to or directly supported by the rig floor 22. Additionally, transport system 100 is moveable relative to platform 20. For example, in some embodiments, transport system 100 may include actuatable support members or feet configured to move or transport the transport system 100 along the surface 3 relative to platform 20.

Figure 2:
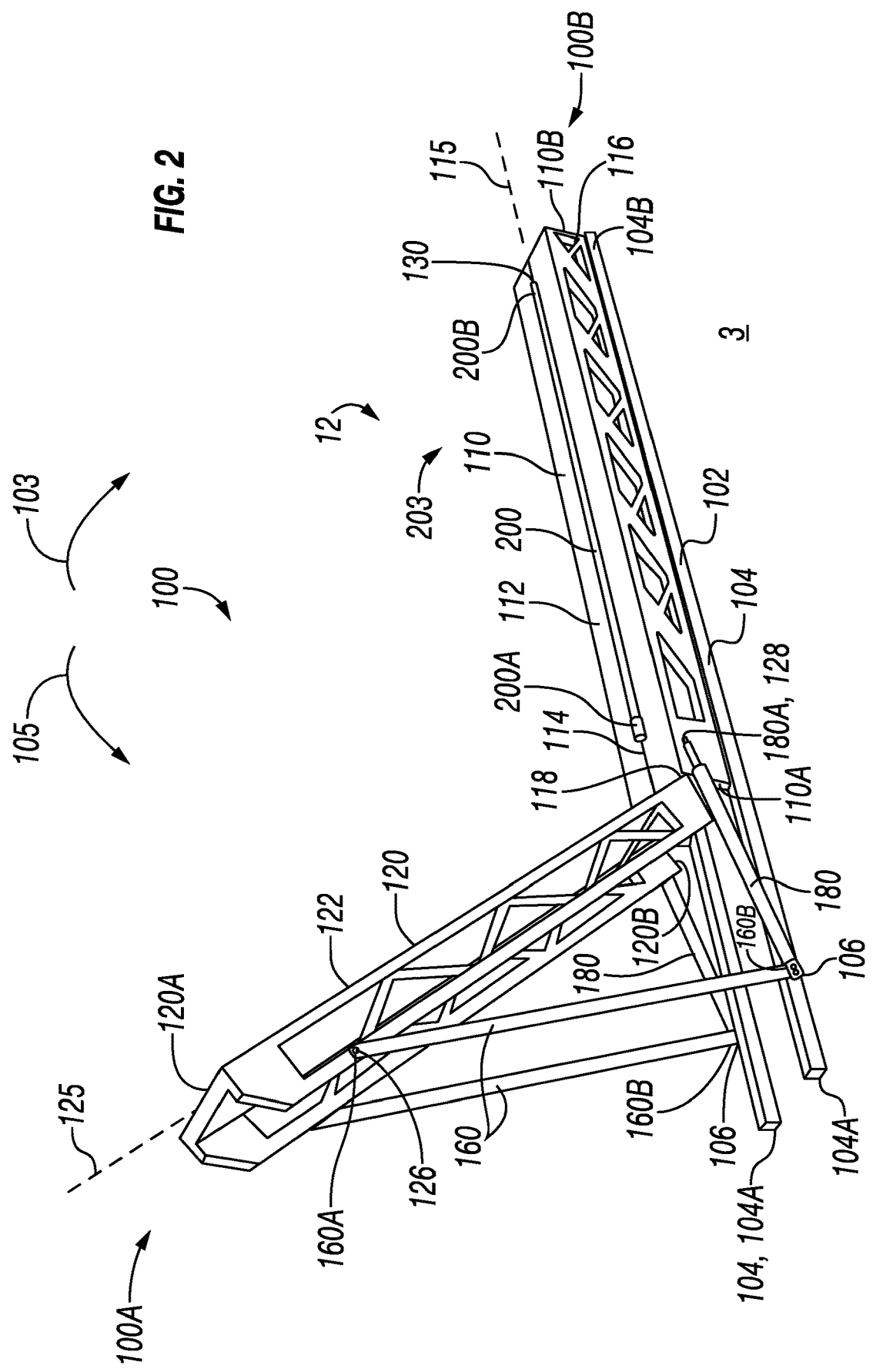
FIG. 2 is a perspective view of an embodiment of a pipe transport system of the well system of FIG. 1 disposed in a first position in accordance with principles disclosed herein.
Figure 3:
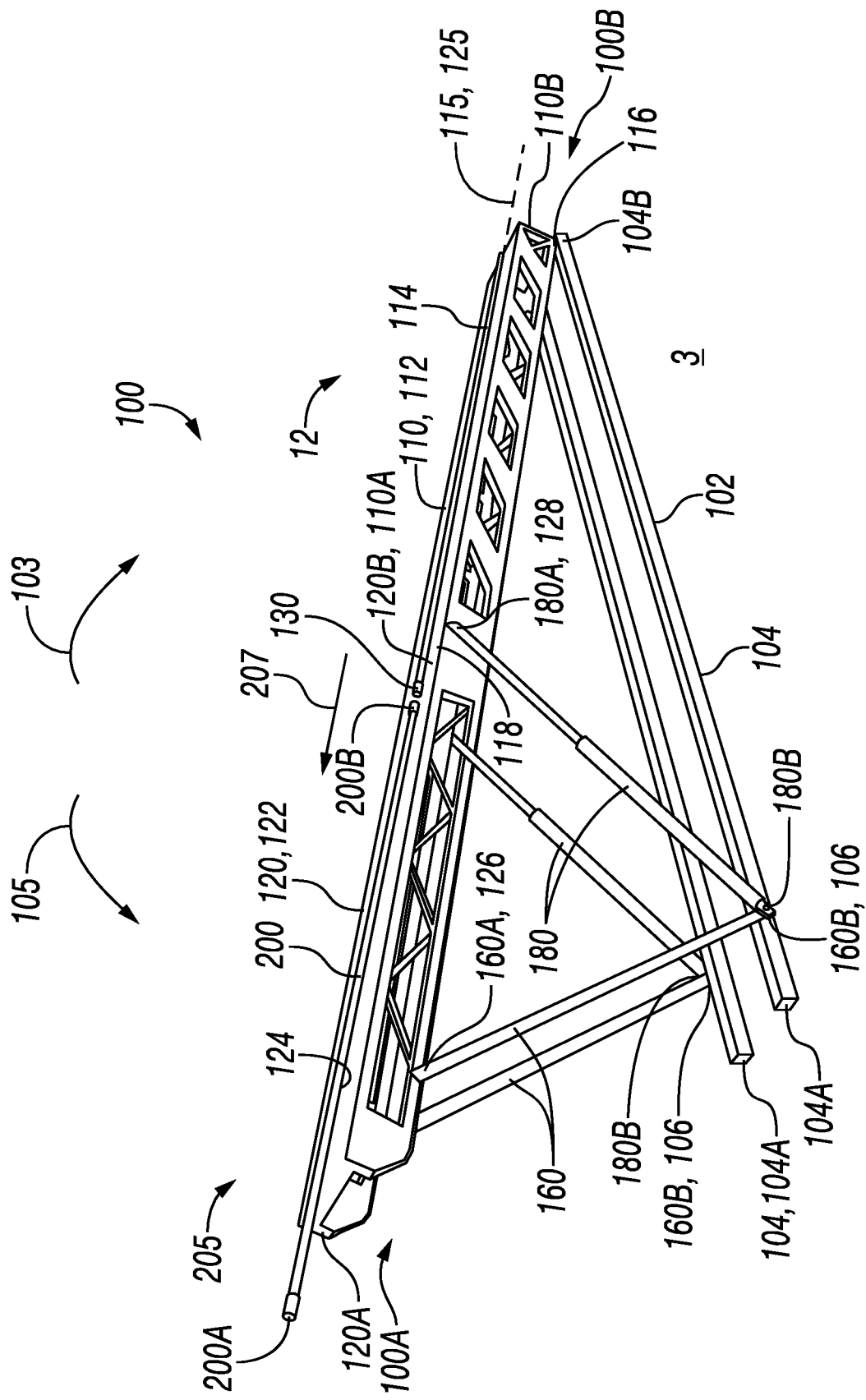
FIG. 3 is a perspective view of the pipe transport system of FIG. 2 disposed in a second position in accordance with principles disclosed herein.

Referring to FIGS. 2 and 3, an embodiment of the transport system 100 of well system 10 is shown in FIGS. 2 and 3. As will be discussed further herein, FIG. 2 illustrates transport system 100 in a first or pipe loading position generally configured to receive a tubular member or drill pipe joint 200 from storage area 12 of well system 10, and FIG. 3 illustrates transport system 100 in a second or pipe transport position generally configured to transport pipe joint 200 both vertically and horizontally from the storage area 12 to a location either aligned vertically overhanging or directly adjacent rig floor 22. In the embodiment shown in FIGS. 2 and 3, transport system 100 generally includes a support frame or substructure 102, a pivotable first transport frame 110, a pivotable second transport frame 120, an actuation ram or pusher 130, a pair of lateral struts or support members 160, and a pair of linear actuators 180.

Substructure 102 of transport system 100 is disposed on the surface 3 and is configured to support the weight of transport system 100 as well as the weight of a drill pipe joint 200 disposed on transport system 100. In the embodiment shown, substructure 102 generally includes a pair of elongate support members 104 that extend between the longitudinal ends 100A and 100B of transport system 100. Particularly, each support member 104 has a first end 104A positioned at the first end 100A of transport system 100, and a second end 104B longitudinally spaced from first end 104A and positioned at the second end 100B of system 100. In this arrangement, one lateral support member 104 extends longitudinally along each lateral side of transport system 100.

In the embodiment shown in FIGS. 2 and 3, each lateral support member 104 includes a pivotal coupling or joint 106 disposed proximal to or adjacent first end 104A. In this embodiment, pivotal joint 106 is pivotably or rotatably coupled to a first or inner end of each strut 160 and a first or inner end of each actuator 180. In this embodiment, support members 104 comprise separate members not directly coupled together, and instead, are indirectly coupled via struts 160 and actuators 180, which couple between members 104 and transport frame 110. In this arrangement, additional space or clearance is provided between support members 104 for other components (including additional wellhead clearance) of well system 10. However, in other embodiments, additional support members or structures may extend laterally between support members 104 to couple support members 104 together. Additionally, in some embodiments, substructure 102 may include support arms (not shown) extending laterally from support members 104 to assist in stabilizing transport system 100 during operation.

Transport frames 110 and 120 of transport system 100 each provides the transport surface for transporting drill pipe joint 200 from the storage area 12 to the rig floor 22 of platform 20. In the embodiment shown in FIGS. 2 and 3, first transport frame 110 has a first end 110A, a second end 110B longitudinally spaced from first end 110A, and a planar support surface 112 extending between ends 110A and 110B. Support surface 112 of first transport frame 110 includes a central track or groove 114 disposed therein that extends between ends 110A and 110B, where groove 114 is configured to at least partially receive pipe joint 200 to thereby secure pipe joint 200 (e.g., prevent pipe joint 200 from rolling off of one of the lateral sides of support surface 112) to first transport frame 110 during transport of pipe joint 200. Similarly, second transport frame 120 has a first end 120A, a second end 120B longitudinally spaced from first end 120A, and a planar support surface 122 extending between ends 120A and 120B, where support surface 122 includes a central track or groove 124 disposed therein that extends between ends 120A and 120B. As will be discussed further herein, support surfaces 112 and 122 are configured to support or physically engage or contact pipe joint 200 during the transport of pipe joint 200 by transport system 100. Support surface 112 of first transport frame 110 has a central or longitudinal axis 115 while support surface 122 of second transport frame 120 has a central or longitudinal axis 125. In the embodiment shown in FIGS. 2 and 3, the second end 110B of first transport frame 110 is generally positioned at the second end 100B of transport system 100 while the first end 120A of second transport frame 120 is generally positioned at the first end 100A of system 100.

Pipe joint 200 has a first or upper end 200A and a second or lower end 200B longitudinally spaced from upper end 200A. In some embodiments, upper end 200A comprises a box end while lower end 200B comprises a pin end, where box end 200A is positioned above pin end 200B when pipe joint 200 is made-up or coupled with the drill string. In the embodiment shown in FIGS. 2 and 3, pusher 130 of transport system 100 is configured to physically engage the lower end 200B of pipe joint 200 to push or transport pipe joint 200 across support surface 112 of first support frame 110 and the support surface 122 of second support frame 120. Thus, pusher 130 is configured to "push" pipe joint 200 along the support surfaces 112 and 122 of transport frames 110 and 120, respectively, to transport pipe joint 200 between storage area 12 and rig floor 22.

Particularly, in the embodiment shown in FIGS. 2 and 3, pusher 130 extends through or is aligned with grooves 114 and 124 in transport frames 110 and 120, respectively, and is actuatable between a first position (shown in FIG. 2) disposed on support surface 112 proximal second end 110B of first transport frame 110 and a second position (shown in FIG. 3) disposed on support surface 122 proximal second end 120B of second transport frame 120. Pusher 130 is configured to be displaced or transported through or along grooves 114 and 124 via an actuator (not shown) of transport system 100. In some embodiments, a hydraulic actuator may be used to transport pusher 130, while in other embodiments, a chain, cable, or other mechanism known in the art may be used to transport pusher 130.

In the embodiment shown in FIGS. 2 and 3, a first pair of pivotal couplings or joints 116 pivotally couple the second end 104B of each support member 104 with the second end 110B of first transport frame 110. Additionally, a second pair of pivotal couplings or joints 118 pivotally couple the first end 110A of first transport frame 110 with the second end 120B of second transport frame 120. In the embodiment shown in FIGS. 2 and 3, struts 160 each comprise an elongate member having a first or upper end 160A and a second or lower end 160B longitudinally spaced from upper end 160A. The upper end 160A of each strut 160 is pivotally coupled with second transport frame 120 via a third pair of pivotal couplings or joints 126, where pivotal joints 126 are longitudinally spaced from both first end 120A and second end 120B of second transport frame 120. The lower end 160B of each strut 160 is pivotally coupled with the support members 104 of substructure 102 via pivotal couplings 106.

Actuators 180 are generally configured to actuate transport system 100 between the loading position shown in FIG. 2 and the transport position shown in FIG. 3. Actuators 180 each include a first end 180A and a second end 180B longitudinally spaced from first end 180A, where each actuator 180 is configured to linearly or telescopically extend and retract first end 180A relative second end 180B. In the embodiment shown in FIGS. 2 and 3, actuators 180 comprise hydraulic actuators; however, in other embodiments, actuators 180 may comprise other types of actuators known in the art. In the embodiment shown in FIGS. 2 and 3, the first end 180A of each actuator 180 is pivotally coupled to first transport frame 110 at a pivotal joint 182, where pivotal joints 182 are disposed at, or proximal to, first end 110A of frame 110. In addition, the second end 180B of each actuator 180 is pivotally coupled to one of the support members 104 of substructure 102 at one of the pivotal joints 106.

In the embodiment shown in FIGS. 2 and 3, extension of actuators 180 rotates first transport frame 110 about pivotal joints 116 in a first rotational direction 103 while retraction of actuators 180 rotates first transport frame 110 about pivotal joints 116 in a second rotational direction 105 opposite first rotational direction 103. Additionally, extension of actuators 180 rotates second transport frame 120 about pivotal joints 126 in the second rotational direction 105 while retraction of actuators 180 rotates second transport frame 120 about pivotal joints 126 in the first rotational direction 103. Thus, extension of actuators 180 reduces or eliminates an angle formed between longitudinal axes 115 and 125 of support surfaces 112 and 122, respectively, while retraction of actuators 180 forms or increases the angle formed between longitudinal axes 115 and 125.

As shown particularly in FIG. 2, transport system 100 includes the loading position configured to receive pipe joint 200 from storage area 12 distal rig floor 22. In the loading position, longitudinal axes 115 and 125 of support surfaces 112 and 122, respectively, are disposed at an angle and support surface 112 is disposed substantially parallel with surface 3 and substructure 102 such that ends 110A and 110B physically engage or are disposed directly adjacent substructure 102. In the loading position, support surface 112 of first transport frame 110 is disposed proximal to and extends substantially parallel with (e.g., is not disposed at an incline) surface 3, providing for convenient transport of pipe joint 200 from storage area 12 to the groove 114 of frame 110. Additionally, in the loading position longitudinal axis 125 of the support surface 122 is disposed at an obtuse angle relative the longitudinal axis 115 of support surface 112. In certain embodiments, when transport system 100 is disposed in the loading position shown in FIG. 2, the first end 120A of second transport frame 120 is spaced from the side 24 of rig floor 22 to provide for additional clearance from wellhead 28 of well system 10.

In some embodiments, pipe joints, such as pipe joint 200, are stored proximal to but laterally spaced from first transport frame 110 such that they may be conveniently conveyed from storage area 12 into groove 114 of frame 110 to occupy a first pipe or loading position 203 on transport system 100 where upper end 200A of pipe joint 200 is laterally spaced from rig floor 22. Once pipe joint 200 has been positioned in groove 114 of first transport frame 110, with transport system 100 in the loading position shown in FIG. 2, transport system 100 may be actuated into the transport position shown in FIG. 3, and subsequently transport pipe joint 200 to a second pipe or "hand-off" position 205 (shown in FIG. 3) proximal the rig floor 22. Particularly, in the embodiment shown in FIGS. 2 and 3, actuators 180 extend to rotate first transport frame 110 about pivotal joints 116 in the first rotational direction 103, and second transport frame 120 about pivotal joints 126 in the second rotational direction 105, thereby reducing or eliminating the angle formed between longitudinal axes 115 and 125 of support surfaces 112 and 122, respectively. Additionally, in response to the actuation or extension of actuators 180, both struts 160 and actuators 180 rotate about pivotal joints 106 in the second rotational direction 105. Due to the rotation of struts 160 in the second rotational direction 105, the first end 120A of second transport frame 120 is displaced horizontally (relative to the surface 3) relative to substructure 102. Particularly, in the embodiment shown in FIGS. 2 and 3, the first end 120A of second transport frame 120 is displaced or travels horizontally towards the side 24 of rig floor 22 when transport system 100 is actuated from the loading position to the transport position, and horizontally away or from the side 24 of rig floor 22 when transport system 100 is actuated from the transport position to the loading position.

In the embodiment shown in FIGS. 2 and 3, with transport system 100 disposed in the transport position shown in FIG. 3, longitudinal axes 115 and 125 are disposed substantially coaxial or parallel and at an angle or incline relative to the surface 3. Pusher 130 supports the lower end 200B of pipe joint 200, with pipe joint 200 disposed at the same incline as support surfaces 112 and 122 of transport frames 110 and 120, respectively. In other words, a longitudinal or central axis of pipe joint 200 is disposed substantially parallel with longitudinal axes 115 and 125 when pipe transport system 100 is in the transport position. Additionally, in the embodiment shown in FIGS. 2 and 3, pusher 130 is free to travel between grooves 114 and 124 of transport frames 110 and 120, respectively, when transport system 100 is in the transport position.

With transport system 100 disposed in the transport position and pipe joint 200 occupying the loading position 203 with lower end 200B disposed proximal second end 110B of first transport frame 110, pusher 130 may be actuated to push against the lower end 200B of pipe joint 200 and thereby transport pipe joint 200 from the loading position 203 to the hand-off position 205. As pipe joint 200 is transported between the loading position 203 and the hand-off position 205, pipe joint 200 engages or slides against support surfaces 112 and 122 and travels in an inclined linear or rectilinear direction 207 relative to the surface 3 to thereby transport pipe joint 200 both laterally and vertically relative surface 3. Pusher 130 moves in concert with pipe joint 200 in the inclined direction 207 between the first position proximal second end 110B of first transport frame 110 to the second position proximal second end 120B of second transport frame 120. In this manner, pipe joint 200 may be transported between positions 203 and 205 using a single actuating mechanism (pusher 130), simplifying the design and operation of transport system 100. Additionally, as pipe joint 200 travels to the hand-off position 205, pipe joint 200 is physically supported by second transport frame 120, which is supported in-turn by struts 160 extending between frame 120 and substructure 102. In this manner, pipe joint 200 may be transported to the hand-off position 205 and rig floor 22 without needing to rely on rig floor 22 for physically supporting second transport frame 120 or other components of transport system 100, providing greater flexibility for operating transport system 100. Moreover, the ability to transport pipe joint 200 to the hand-off position 205 and rig floor 22 via the inclined linear movement 207 (facilitated by the direct connection formed between first transport frame 110 and substructure 102 via actuators 180) enhances the speed and safety of the operation and reduces the probability of damaging pipe joint 200.

In the embodiment shown in FIGS. 2 and 3, the lower end 200B of pipe joint 200 is spaced from the second end 110B of first transport frame 110 while the upper end 200A extends past the first end 120A of second transport frame 120 when pipe joint 200 is in the hand-off position 205; however, in other embodiments, upper end 200A of pipe joint 200 may be disposed at or proximal to, but not past, the first end 120A of second transport frame 120. In certain embodiments, the upper end 200A of pipe joint 200 extends over rig floor 22 (e.g., pipe joint 200 extends across or over a side 24 of rig floor 22), allowing for convenient transport of pipe joint 200 from storage area 12 to the rig floor 22 for coupling with the drill string of well system 10.

In the embodiment shown in FIGS. 2 and 3, with transport system 100 disposed in the transport position shown in FIG. 3, the first end 120A of second transport frame 120 remains separate from (e.g., is not coupled with or supported by) rig floor 22 or any other component of platform 20. Thus, in this embodiment, first end 120A of second transport frame 120 is configured to overhang but remain vertically spaced from rig floor 22 when transport system 100 is in the transport position. Further, the weight of transport frames 110 120, and pipe joint 200 is supported by substructure 102 via struts 160 and actuators 180, and thus, rig floor 22 is not relied upon for supporting loads from transport system 100. Moreover, in certain embodiments, the first end 120A of second transport frame 120 is vertically spaced from rig floor 22 when transport system 100 is in the transport position. Thus, substructure 102 is configured to support the entire weight of drill pipe joint 200 both when drill pipe joint 200 is in the loading position 203, hand-off position, or travelling therebetween. Particularly, struts 160 are configured to transfer the weight of pipe joint 200 and second transport frame 120 to substructure 102, which is supported by the surface 3. In this manner, transport system 100 comprises a stand-alone or self-contained transport system separate from platform 20, obviating the need to provide for a connection or interface between transport system 100 and platform 20, or to configure platform 20 to support loads from transport system 100. Further, in the embodiment shown in FIGS. 2 and 3, actuators 180 couple directly between substructure 102 and first transport frame 110 (which receives pipe joint 200), eliminating any intermediary pivotable components coupled between the actuators and transport frame used to support and transport pipe joint 200, thereby reducing the complexity of transport system 100.

While transport system 100 is described above in the context of transporting pipe joint 200 from storage area 12 to rig floor 22, pipe joints 200 may be transported from rig floor 22 to storage area 12 when "tripping" pipe joints 200 out of wellbore 8 by disposing transport system 100 in the transport position shown in FIG. 3 and positioning the pipe joint 200 in the hand-off position 205, with pipe joint 200 received in the groove 124 of second transport frame 120. Once pipe joint 200 is disposed in the hand-off position 205, pipe joint 200 may be displaced or transported from the hand-off position 205 to the loading position 203 by displacing pusher 130 towards the first position of pusher 130 shown in FIG. 2. With pipe joint 200 disposed in the loading position 203, transport system 100 may be actuated from the transport position shown in FIG. 3 to the loading position shown in FIG. 2, after which pipe joint 200 may be conveniently off loaded to storage area 12.

Figure 4:
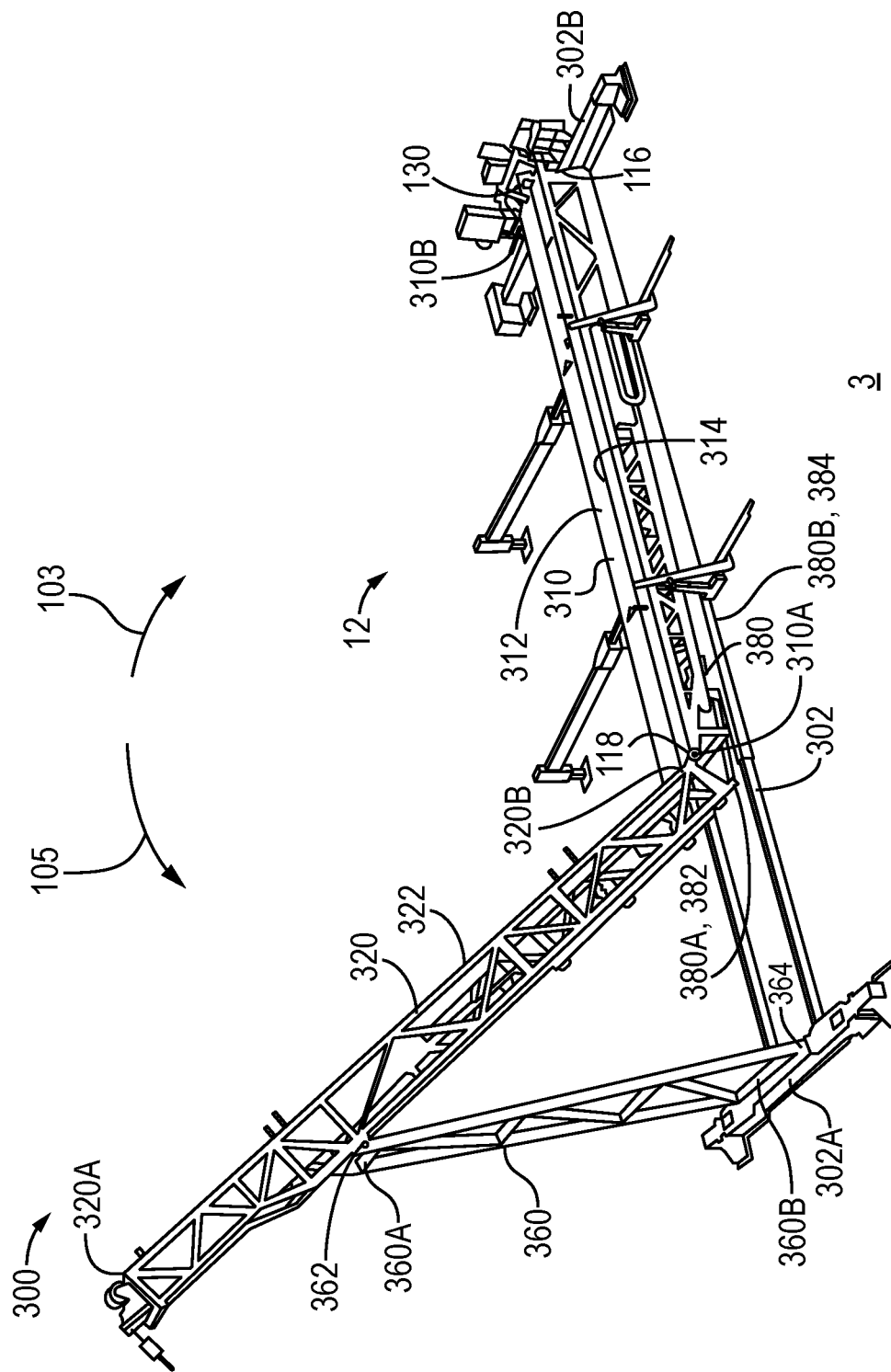
FIG. 4 is a perspective view of another embodiment of a pipe transport system of the well system of FIG. 1 disposed in a first position in accordance with principles disclosed herein.
Figure 5:
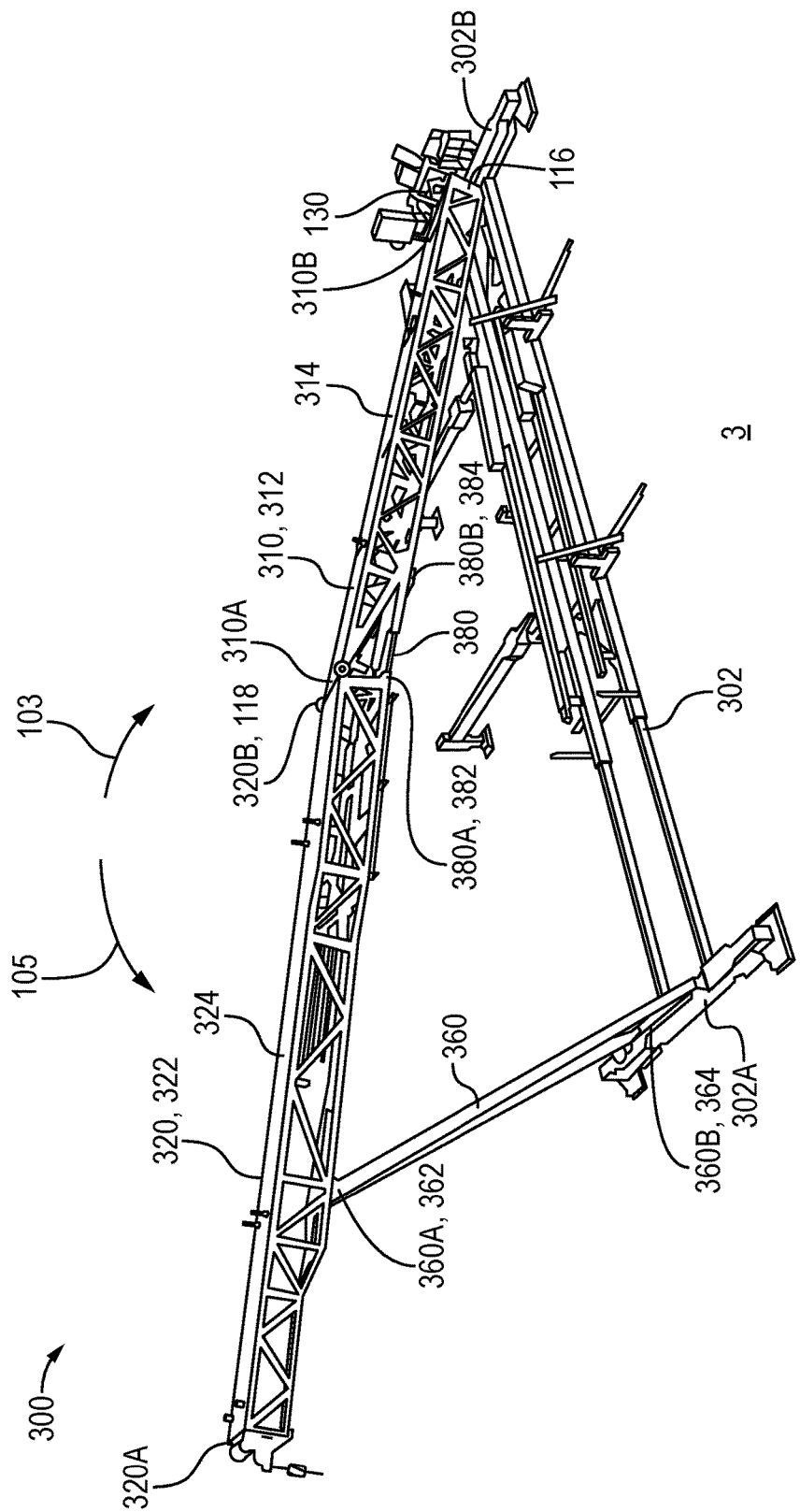
FIG. 5 is a perspective view of the pipe transport system of FIG. 4 disposed in a second position in accordance with principles disclosed herein.

Referring to FIGS. 4 and 5, another embodiment of a transport system 300 for use with the well system 10 of FIG. 1 is shown. Transport system 300 includes features in common with the transport system 100 shown in FIGS. 2 and 3, and shared features are labeled similarly. Transport system 300 generally includes a support frame or substructure 302, a pivotable first transport frame 310, a pivotable second transport frame 320, pusher 130, a support structure or strut 360, and a pair of linear actuators 380. Substructure 302 of transport system 300 provides functionality similar to that provided by substructure 102 of transport system 100. In the embodiment shown in FIGS. 4 and 5, substructure 302 has a first end 302A, and a second end 302B longitudinally spaced from first end 302A.

First transport frame 310 and second transport frame 320 provide functionality similar to that provided by first and second transport frames 110 and 120, respectively, of transport system 100. In the embodiment shown in FIGS. 4 and 5, first transport frame 310 has a first end 310A, a second end 310B longitudinally spaced from first end 310A, a planar support surface 312 extending between ends 310A and 310B, and a central groove or track 314 extending along support surface 312. Similarly, second transport frame 320 has a first end 320A, a second end 320B longitudinally spaced from first end 320A, a planar support surface 322 extending between ends 320A and 320B, and a central groove or track 324 extending along support surface 322. Strut 360 of transport system 300 is similar in function to strut 160 of transport system 100. In the embodiment shown in FIGS. 4 and 5, strut 360 has a first or upper end 360A pivotally coupled to second transport frame 320 at a first or upper pivotal joint 362, and a second or lower end 360B longitudinally spaced from upper end 360A and pivotally coupled to substructure 302 at a second or lower pivotal joint 364, where lower pivotal joint 364 is positioned at the first end 302A of substructure 302.

As will be discussed further herein, actuators 380 provide similar functionality as actuators 180 of transport system 100. In the embodiment shown in FIGS. 4 and 5, each actuator 380 has a first end 380A pivotally coupled to the second end 320B of second transport frame 320 at a third pivotal joint 382, and a second end 380B pivotally coupled to the first transport frame 310 at a fourth pivotal joint 384, where fourth pivotal joint 384 is positioned proximal first end 310A of frame 310. In this arrangement, extension of the first end 380A of actuator 380 from second end 380B is configured to rotate second transport frame 320 about upper pivotal joint 362 in the second rotational direction 105 to reduce an angle formed between longitudinal axes of support surfaces 312 and 322 of transport frames 310 and 320, respectively. Conversely, retraction of the first end 380A of actuator 380 towards second end 380B is configured to rotate second transport frame 320 about upper pivotal joint 362 in the first rotational direction 103 to increase an angle formed between longitudinal axes of support surfaces 312 and 322 of transport frames 310 and 320, respectively. In this configuration, actuators 380 may provide similar functionality as actuators 180 while having a reduced overall length and offering increased clearance or access to the space between transport frames 310 and 320 and substructure 302 when transport system 300 is in the transport position.

In the embodiment shown in FIGS. 4 and 5, transport system 300 includes a first or loading position shown in FIG. 4, and a second or transport position shown in FIG. 5. In the loading position shown in FIG. 4, transport system 300 is configured to receive a tubular member, such as drill pipe 200 shown in FIGS. 2 and 3, similar to the functionality provided by the loading position of transport system 100. In the transport position shown in FIG. 5, transport system 300 is configured to transport a tubular member between storage area 12 and a rig floor, such as rig floor 22 shown in FIG. 1, similar to the functionality provided by the transport position of transport system 100. Like actuators 180 of transport system 100, actuators 380 of transport system 300 are configured to extend and retract to actuate transport system 300 between the loading and transport positions. However, unlike actuator 180 of transport system 100, actuator 380 of system 300 is not directly coupled with substructure 302, and instead, is coupled directly between the adjacent ends of transport frames 310 and 320.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A catwalk for transporting tubular members of a well system, comprising:
a substructure;
a first transport frame pivotally coupled to the substructure at a first pivotal joint and comprising a first support surface configured to engage the tubular member;
a second transport frame pivotally coupled to the first transport frame at a second pivotal joint and comprising a second support surface configured to engage the tubular member; and
an actuator having a first end pivotally coupled to the first transport frame and a second end pivotally coupled to the second transport frame, wherein the actuator is configured to actuate the catwalk between a first position configured to receive the tubular member and a second position configured to transport the tubular member between the first support surface and the second support surface.

2. The catwalk of claim 1, further comprising a ram configured to displace the tubular member in a linear direction between the first support surface and the second support surface.

3. The catwalk of claim 2, wherein the ram is configured to push against an end of the tubular member to displace the tubular member between the first support surface and the second support surface.

4. The catwalk of claim 2, wherein:
the first support surface comprises a first central groove configured to receive the tubular member;
the second support surface comprises a second central groove configured to receive the tubular member; and
the ram is configured to travel through both the first central groove and the second central groove.

5. The catwalk of claim 1, further comprising a strut pivotally coupled between the second transport frame and the substructure, wherein the strut is configured to transfer the weight of the tubular member from the second transport frame to the substructure when the tubular member is transported between the first support surface and the second support surface.

6. The catwalk of claim 5, wherein:
the actuator is configured to rotate the first transport frame in a first rotational direction about the first pivotal joint in response to extending the first end of the actuator from the second end of the actuator; and
the actuator is configured to rotate the second transport frame about a third pivotal joint coupling the stmt with the second transport frame in a second rotational direction opposite the first rotational direction in response to extending the first end of the actuator from the second end of the actuator.

7. The catwalk of claim 1, wherein:
a first longitudinal axis of the first support surface is disposed at an angle relative to a second longitudinal axis of the second support surface when the catwalk is in the first position; and
the first longitudinal axis is disposed parallel with the second longitudinal axis when the catwalk is in the second position.

\* \* \* \* \*